United States Patent [19]
Kokura et al.

[11] Patent Number: 5,808,434
[45] Date of Patent: *Sep. 15, 1998

[54] NUMERICAL CONTROL APPARATUS

[75] Inventors: Masuo Kokura, Hino; Minoru Jinnai, Minamitsuru-gun, both of Japan

[73] Assignee: Fanuc, Ltd., Minamitsuru-gun, Japan

[*] Notice: The terminal 27 months of this patent has been disclaimed.

[21] Appl. No.: 290,754

[22] PCT Filed: Dec. 7, 1993

[86] PCT No.: PCT/JP93/01777

§ 371 Date: Aug. 15, 1994

§ 102(e) Date: Aug. 15, 1994

[87] PCT Pub. No.: WO94/15266

PCT Pub. Date: Jul. 7, 1994

[30] Foreign Application Priority Data

Dec. 28, 1992 [JP] Japan ................................. 4-348184

[51] Int. Cl.$^6$ ....................................................... G05B 19/18
[52] U.S. Cl. ........................... 318/569; 318/600; 318/567; 318/574
[58] Field of Search ....................... 318/600, 569, 318/567, 574; 264/474.01, 474.02

[56] References Cited

U.S. PATENT DOCUMENTS

| | | | |
|---|---|---|---|
| 4,521,845 | 6/1985 | Schwefel | 318/569 |
| 4,607,327 | 8/1986 | Kishi et al. | 318/569 |
| 4,680,697 | 7/1987 | Kiya et al. | 318/568 |
| 4,788,481 | 11/1988 | Niwa | 318/600 |
| 5,212,430 | 5/1993 | Jartyn | 318/600 |
| 5,218,281 | 6/1993 | Sasaki et al. | 318/600 |
| 5,309,364 | 5/1994 | Aramaki et al. | 318/474.01 |

FOREIGN PATENT DOCUMENTS

| | | |
|---|---|---|
| 58-51306 | 3/1983 | Japan . |
| 60-256803 | 12/1985 | Japan . |
| 62-173140 | 7/1987 | Japan . |

Primary Examiner—William M. Shoop, Jr.
Assistant Examiner—Karen Masih
Attorney, Agent, or Firm—Haas & Halsey

[57] ABSTRACT

A numerical control apparatus having command input panels including the number of command keys corresponding to an application program. An application execution unit receives and stores command data output from a machine control console as well as executes an application program generated by the operator and outputs a pulse signal for commanding the operation of a machine tool such as the movement of the machine tool. An interpolation unit receives the pulse signal output from the application execution unit, outputs an interpolation pulse, and supplies the interpolation pulse to an axis control circuit. The axis control circuit receives the interpolation pulse output from the interpolation unit, generates a speed command for each axis and supplies the speed command to a servoamplifier. The servoamplifier controls the machine tool by energizing servomotors mounted thereon.

4 Claims, 4 Drawing Sheets

NUMERICAL CONTROL APPARATUS

TECHNICAL FIELD

The present invention relates to a numerical control apparatus for controlling a machine tool, and more specifically, to a numerical control apparatus for controlling the operation of a machine tool by entering various data from a machine control console.

BACKGROUND ART

Advances in the technology of numerical controlled machine tools have been so great that they can machine workpieces of complex shape at high speed with precision. At present, workpieces having complex shapes cannot be machined without numerically controlled machine tools.

To generate machining programs, there are widely used interactive numerical control apparatuses which comprise a numerical control apparatus with an interactive program generating function, and an automatic programming apparatus for simply generating complex machining programs.

In the use of such a numerical control apparatus, it is necessary to accurately define machine coordinates, a machine origin, program coordinates, and other data for generating strict machining programs. Although the interactive numerical control apparatus and the automatic programming apparatus can be used for machining a number of workpieces, for some machining processes for producing a prototype or a model, general-purpose milling machines, lathes or the like are used which require a short period of time to carry out preparatory action such as attachment and detachment of workpieces, installation of tools, etc., and do not require machining programs to be generated.

Problems of general-purpose machine tools are that recently the number of available operators which can handle general-purpose machine tools is becoming smaller, and it is difficult for the general-purpose machine tools to carry out complicated machining such as oblique linear machining, arcuate machining, or the like, though they can effect linear machining without any problem.

Generally used numerically controlled machine tools include an input command panel and a machine control panel as input panels, for accurately defining the machine coordinates, the machine origin and the like. The input command panel has command keys through which commands can be entered to input and display NC command data, to set and display amounts of offset of a tool position and to display various alarm signals, etc. The machine control panel has command keys through which commands can be entered to store a result of a test cutting operation effected manually in the numerical control apparatus and to carry out an automatic operation and the like.

The operator has been able to control the operation of a machine tool at will by the use of the above input panels. For example, when the operator generates an application program by using a function provided for the numerical control apparatus, the operation of the machine tool can be controlled by detecting only the commands entered through the machine control panel.

In the above application program, however, commands entered through the input command panel cannot be detected. Further, since the input command panel includes all the command keys necessary to carry out data input and the like, a problem arises in that operability is lowered.

DISCLOSURE OF THE INVENTION

Taking the above into consideration, an object of the present invention is to provide a numerical control apparatus having an input panel including the number of command keys corresponding to an application program.

To solve the above problems, according to the present invention, there is provided a numerical control apparatus for controlling a machine tool having at least two axes, comprising input means having at least two command input panels for entering command data for controlling the operation of the machine tool, application execution means for receiving and storing the command data, executing a generated application program and outputting a pulse signal for commanding the operation of the machine tool such as the movement of a tool, and the like, and interpolation means for outputting an interpolation pulse in response to the pulse signal.

BEST MODE FOR CARRYING OUT THE INVENTION

An embodiment of the present invention will be described below with reference to the drawings.

Figure 2:
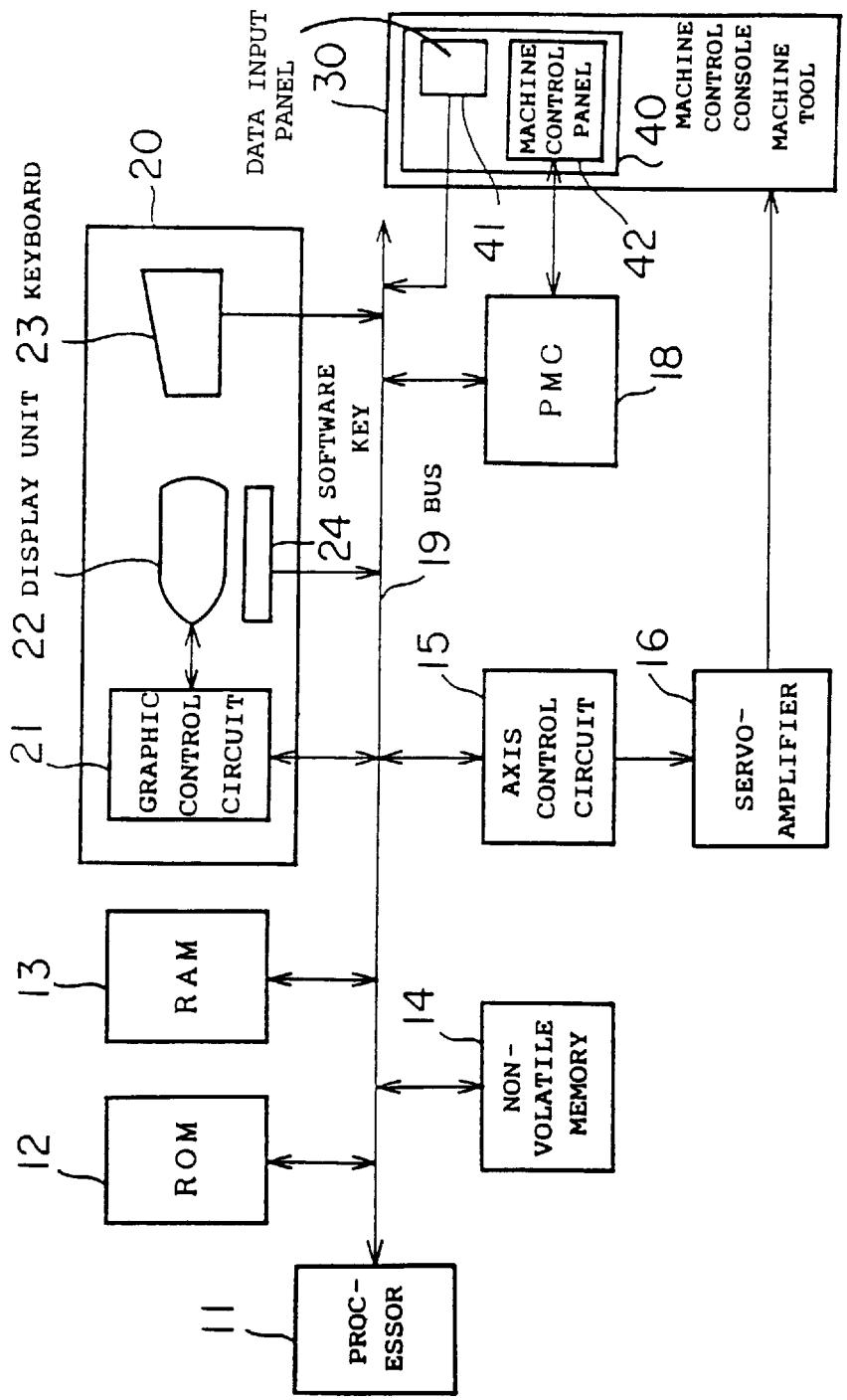
FIG. 2 is a block diagram showing an overall arrangement of an interactive numerical control apparatus.

FIG. 2 is a block diagram showing an overall arrangement of a numerical control apparatus embodying the present invention.

A processor 11 controls the numerical control apparatus in its entirety according to a system program stored in a ROM 12. The ROM 12 comprises an EPROM or an EEPROM. A RAM 13, which comprises an SRAM or the like, stores various data or input and output signals. A nonvolatile memory 14 comprises a CMOS that is backed up by a battery (not shown) and stores application programs, macros, parameters, amounts of pitch error correction, amounts of tool correction and the like which are to be retained after the power supply is turned off.

A graphic control circuit 21 converts a digital signal into a displayable signal and supplies the displayable signal to a display unit 22. The display unit 22 comprises a CRT or a liquid crystal display panel. When a machining program is generated in an interactive fashion, the display unit 22 displays shapes, machining conditions and the like. The digital signal supplied to the graphic control circuit 21 is a signal supplied thereto when the processor 11 executes a display screen processing program stored in the ROM 12 with respect to a machining program stored in the nonvolatile memory 14. A keyboard 23 comprises a cursor key, shape element input keys, numerical keys and the like and necessary graphic data, machining data and the like are entered using these keys. A software key 24 has a function which varies depending on a system program or the like. The respective components such as the graphic control circuit 21, the display unit 22, the keyboard 23 and the software key 24 are mounted on a CRT/MDI panel 20.

Input display screen images of interactive data to be displayed on the display unit 22 are stored in the ROM 12. When a machining program is generated, an overall moving locus and the like of a tool is displayed on the input display screen images of interactive data as a background animation. Further, a job or data which can be set by the input display screen images is displayed on the display unit 22 in a menu fashion. A desired item in a menu is selected with the software key 24 disposed below a display screen in correspondence with the menu. The software key 24 has a different meaning depending upon each display screen image. Various interactive data is stored in the RAM 13 or the nonvolatile memory 14.

An axis control circuit 15 receives axis movement commands from the processor 11 and outputs the axis movement commands to a servoamplifier 16. In response to the axis movement commands, the servoamplifier 16 energizes servomotors on a machine tool 30. The machine tool 30 has, in addition to the servomotors (not shown), a machine control console 40 operable for entering commands such as the movement commands and the like. The machine control console 40 will be described in detail later on.

A PMC (programmable machine controller) 18 receives a T function signal (tool selection command) and the like when a machine program is executed. The PMC 18 processes the received signal according to a sequence program, and outputs an operation command as a signal to control the operation of the machine tool 30. Further, the PMC 18 receives state signals from the machine tool 30, sequentially processes the state signals and transfers necessary input signals to the processor 11.

The aforesaid components are interconnected through a bus 19, except for the servoamplifier 16 and the display unit 22.

In the above arrangement, input data is processed by the processor 11 and a machining program is generated. The generated program data is sequentially displayed on the display unit 22 usable in an interactive fashion as a background animation. Further, when a machining simulation of the machine tool 30 is carried out, a machining program stored in the nonvolatile memory 14 is also executed and displayed as a foreground animation.

Figure 3:
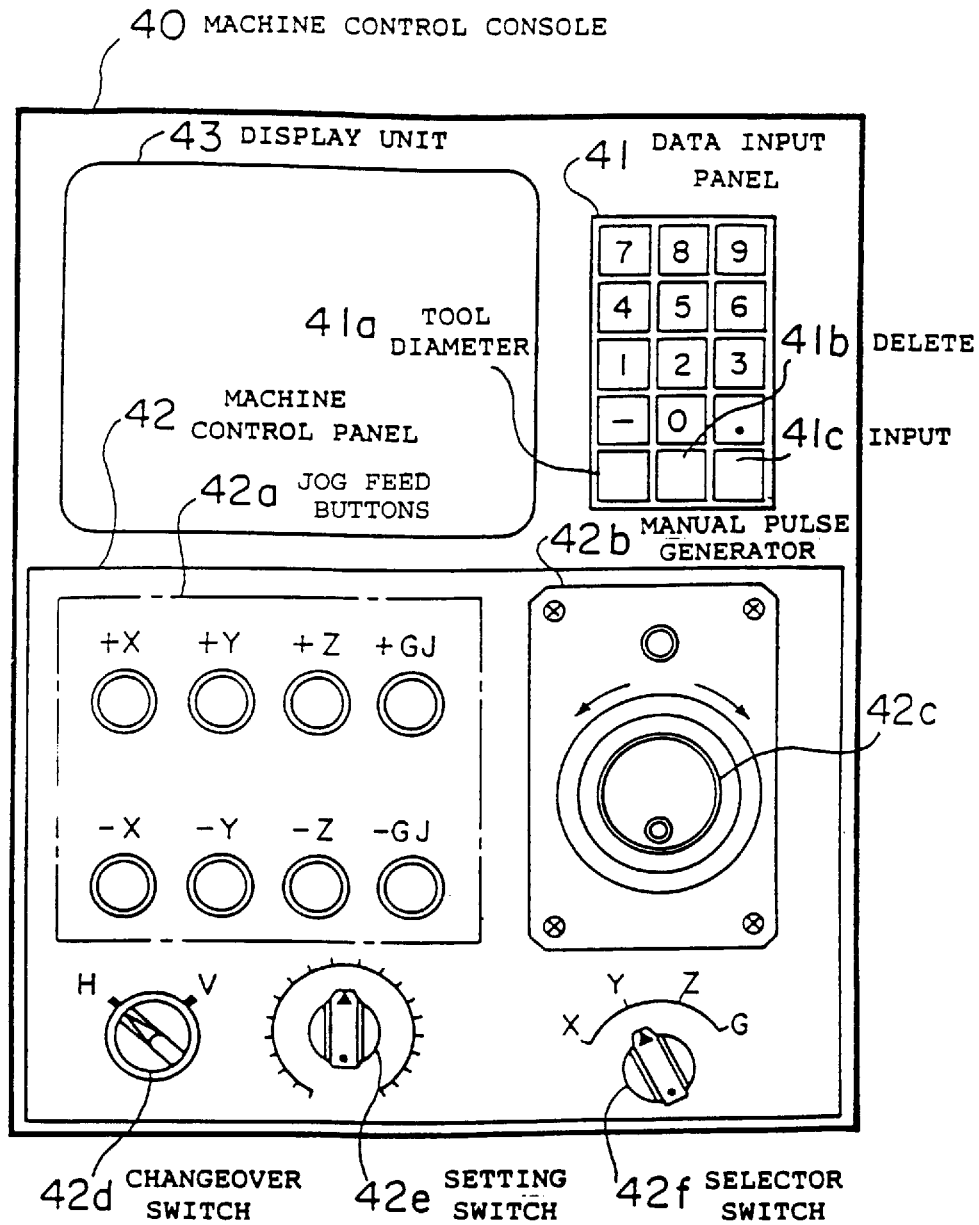
FIG. 3 is a view showing an arrangement of a machine control console.

FIG. 3 is a view showing an arrangement of the machine control console 40 provided on the machine tool 30 by way of example. The machine control console 40 shown in FIG. 3 comprises a data input panel 41, a machine control panel 42 and a display unit 43 when roughly classified.

The data input panel 41 includes data input keys such as numerical keys to which numeric values from "0" to "9" are marked, respectively, a "– (minus)" key and a ". (decimal point)" key. Further, the data input panel 41 includes as auxiliary keys a tool diameter command key 41a with "TOOL DIAMETER" marked thereon, a delete command key 41b with "DELETE" marked thereon, and an input command key 41c with "INPUT" marked thereon, each disposed below the data input keys.

The machine control panel 42 includes a manual pulse generator 42b, a selector switch 42f, jog feed buttons 42a, a setting switch 42e and a changeover switch 42d.

When a handle 42c is turned clockwise or counterclockwise, the manual pulse generator 42b generates a pulse signal depending on the rotation of the handle 42c. The pulse signal, which is composed of two-phase pulses for determining the direction in which the handle 42c is turned, is sent through the bus 19 to the processor 11 for moving a tool. The selector switch 42f is a switch for selecting a pulse signal generated by the manual pulse generator 42b in either an X-axis direction (X), a Y-axis direction (Y), a Z-axis direction (Z), or a direction (G) corresponding to a designated shape and outputs a changeover signal SS depending upon a changed side.

The jog feed buttons 42a comprise a total of 8 buttons including positive and negative feed buttons "+X", "–X", "+Y", "–Y", "+Z", and "–Z" for the respective X-, Y-, and Z-axes, and positive and negative feed buttons "+GJ", "–GJ" corresponding to the designated shape.

The setting switch 42e sets the number of pulses in a certain period of time which are generated when the jog feed buttons 42a are pressed by the operator. Specifically, the setting switch 42e receives a pulse obtained by dividing a pulse from a crystal oscillator (not shown) and outputs the pulse in a dividing ratio in accordance with a scale set by the operator.

The changeover switch 42d changes the parallel movement (H) of a tool which moves while keeping a distance between the present position of the tool and a designated shape and the vertical movement (V) of a tool which moves forwardly or backwardly of a direction shown by a normal line segment from the present position of the tool to a designated shape and outputs a changeover signal SS corresponding to a changed side.

Therefore, when manually moving a tool, the operator first sets the selector switch 42f and the changeover switch 42d to a desired moving direction and then turns the handle 42c. Further, when the operator moves the tool by a jog feed, the operator sets a feed speed with the setting switch 42e and then presses the button having a desired direction of the jog feed buttons 42a.

Since the command keys provided on the data input panel 41 and the machine control panel 42 mounted on the machine control console 40 comprise the minimum number of command keys in accordance with an application program to be described later on, unnecessary command keys can be omitted. Thus, a production cost can be lowered. Further, since the data input panel 41 and the machine control panel 42 are arranged in accordance with the application program, by taking the disposition of the command keys into consideration, the operability of the panels is improved.

Figure 1:
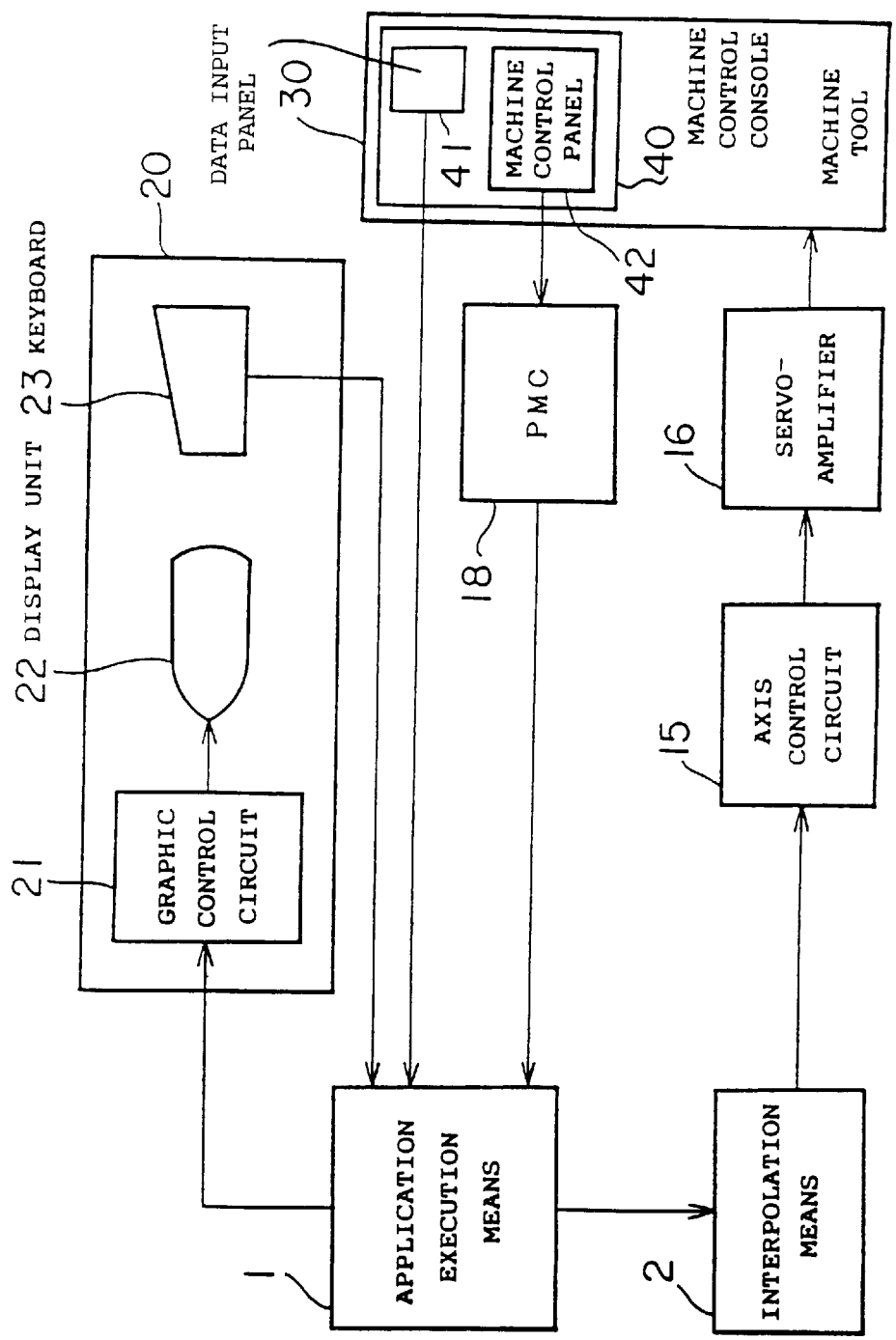
FIG. 1 is a diagram explaining a principle of the present invention.

FIG. 1 is a diagram explaining a principle of the present invention as well as an embodiment thereof. A numerical control apparatus of the present invention comprises the respective components of a machine control console 40 as input means, application execution means 1 and interpolation means 2. The same numerals as used in FIGS. 2 and 3 are used in FIG. 1 to denote the same components and the description of the components is omitted. Further, the application execution means 1 and the interpolation means 2 are functions realized by the processor 11 which performs a system program stored in the ROM 12 or the like shown in FIG. 2.

The application execution means 1 receives and stores command data entered by an operator through the machine control console 40 as the input means and displays a generated moving path and the like of a tool on a display unit 22 through a graphic control circuit 21. Further, the application execution means 1 generates an application program from the command data inputted by the operator, stores the application program in the nonvolatile memory 14, executes the application program and outputs a pulse signal for commanding the operation of a machine tool such as a movement of a tool, and the like.

The interpolation means 2 outputs an interpolation pulse in response to the pulse signal output from the application execution means 1 and supplies the interpolation pulse to an axis control circuit 15. The axis control circuit 15 is actually provided for each of three axes. The axis control circuit 15 generates a speed command for each axis in response to the interpolation pulse output from the interpolation means 2 and supplies the speed command to a servoamplifier 16. The servoamplifier 16 controls a machine tool 30 by energizing servomotors mounted thereon.

Next, a processing sequence will be described with respect to the case in which a moving path or the like of a tool is defined by the operation of the respective keys of the data input panel 41 on the machine control console 40 and the case in which a moving path or the like of the tool is defined by the operation of the respective keys of the machine control panel 42 on the machine control console 40.

Figure 4:
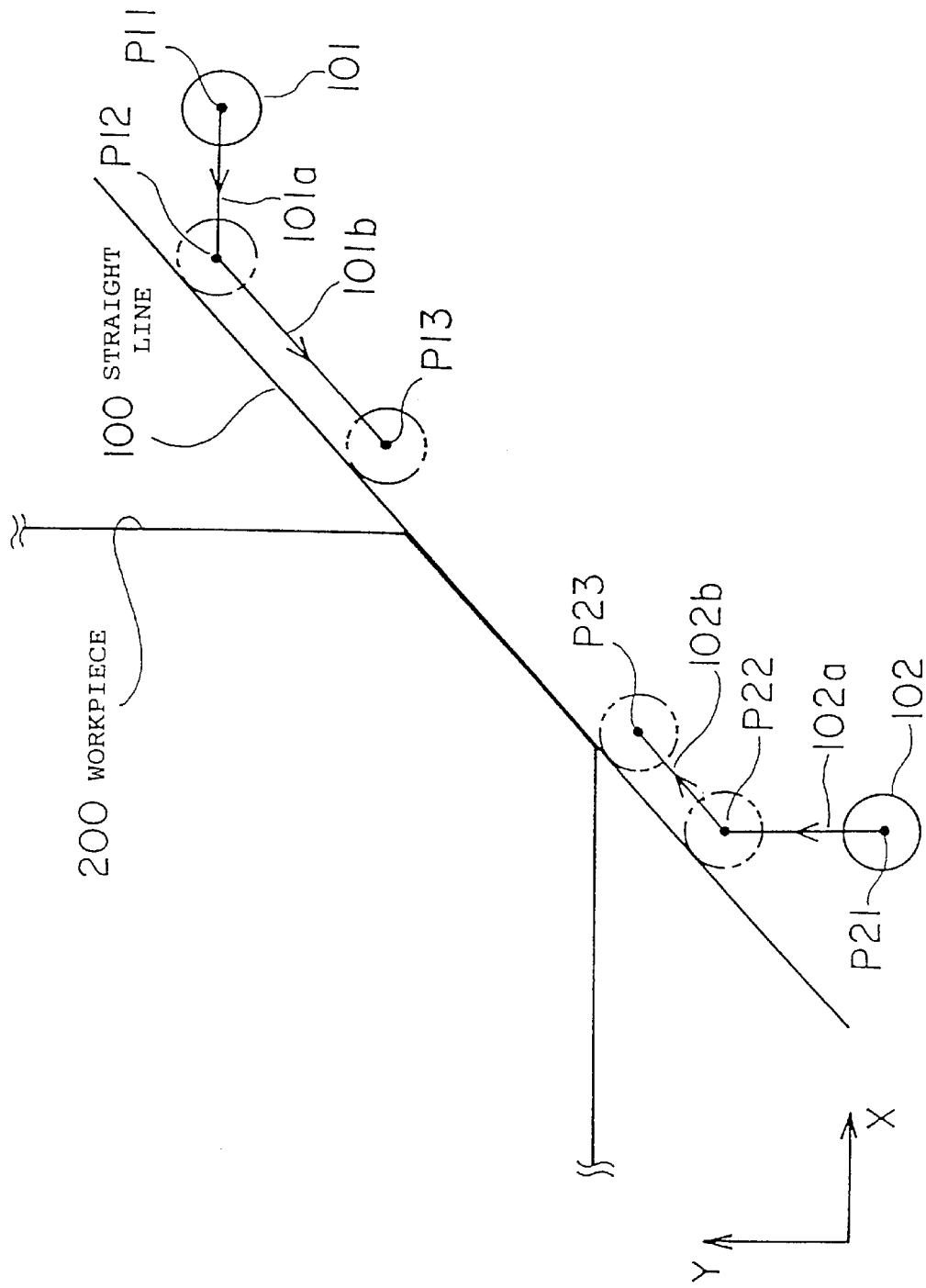
FIG. 4 is a view showing data input by way of an example.

FIG. 4 is a view showing data input by way of example in which a sequence for defining a moving path 101a and the like of a tool is indicated. In FIG. 4, a straight line 100 and a workpiece 200 are graphics which have been entered through the data input panel 41 or the machine control panel 42 shown in FIG. 1 and stored in the application execution means 1. A tool 101 has a center located at a position P11 and a tool 102 has a center located at a position P21.

The sequence for defining the moving path 101a or the like of the tool by the operation of the data input panel 41 will be described. First, an input mode is changed by pressing an input command key 41c as shown in FIG. 3. Thereafter, the coordinate values of positions P12, P13 to which the tool 101 moves are sequentially input by means of data input keys such as numerical keys and the like. When data is to be deleted after the data has been input, a delete key 41b is pressed. When a tool diameter is to be input, a tool diameter command key 41a is pressed and then diameter data is input by means of data input keys such as numerical keys and the like.

Next, the sequence for defining the moving path 101a and the like of the tool 101 by the operation of the machine operation panel 42 will be described. First, a selector switch 42f is set to an X-axis (X) side. When a handle 42c is turned to the left, the tool 101 is moved from the position P11 in the direction of the moving path 101a parallel to the X-axis in accordance with a turning angle of the handle 42c. Thereafter, when the handle 42c is continuously turned to the left in this state, the tool 101 changes its moving direction at the point P12 where the tool 101 comes into contact with the straight line 100 and moves in the direction of a path 101b along the straight line 100. Then, the handle 42c is continuously turned to the left until the tool 101 finally reaches the point P13 where a machining operation starts.

As described above, the application execution means 1 of FIG. 1 determines the moving path 101a of the tool from the position P11 to the position P12 and the moving path 101b of the tool from the position P12 to the position P13 based on the data input through the data input panel 41 or the machine control panel 42. The interpolation means 2 which has received a pulse signal output from the application execution means 1 supplies an interpolation pulse corresponding to the pulse signal to the machine tool 30 through an axis control circuit 15 and the like so that the tool can be actually moved.

When the tool 102 is at the position P21, the application execution means 1 of FIG. 1 can determine a moving path 102a of the tool 102 from the position P21 to a position P22 and a moving path 102b of the tool 102 from the position P22 to a position P23 by inputting data in the same sequence as above.

A direction in which a tool is to be moved when the handle 42c is turned to the right or to the left in the machine control panel 42 can be designated by an input effected by the operator in accordance with a parameter or the like. For example, in the movement of the tool 101, whether it is to be moved in the direction of the path 101a or in the direction opposite to the path 101a when the handle 42c is turned to the left can be designated in accordance with the parameter or the like. With this arrangement, operability can be improved.

Although the above embodiment has been described with respect to a milling machine, the present invention is also applicable to a lathe, etc., in the same way.

As described above, according to the present invention, since the application execution means receives and stores command data entered from the input means provided with at least two command input panels, a generated application program is executed so that a pulse signal for commanding the operation of the machine tool, such as the movement of a tool, is output. The interpolation means outputs an interpolation pulse in response to the pulse signal, the number of command keys on the command input panels provided on the input means can be increased or decreased at will in accordance with the application program and the machine tools to be controlled, and thus unnecessary keys can be omitted. As a result, a production cost can be lowered.

We claim:

1. A numerical control apparatus for controlling an operation of a machine tool having at least two axes, said numerical control apparatus comprising:

input means having at least two command input panels for entering command data to control the operation of the machine tool;

application execution means for receiving and storing said command data, generating an application program using said command data with figures predefined, executing said generated application program and outputting a pulse signal for commanding the operation of said machine tool; and interpolation means for outputting an interpolation pulse to the machine tool in response to said pulse signal.

2. The numerical control apparatus according to claim 1, wherein said input means comprises:

a data input panel for entering numerical data concerning the operation of the machine tool; and a machine control panel for commanding the operation of said machine tool.

3. A numerical control apparatus for controlling an operation of a machine tool having at least two axes and displaying the operation on a display, said numerical control apparatus comprising:

input means having first and second command panels for entering command data to selectively control the same operation of the machine tool, said first command panel having keys to control the machine tool and said second command panel having knobs to control the machine tool; and driving means for driving the machine tool based upon said command data;

wherein said first command panel is used to enter, on the display, a current position of a workpiece and a straight line which is not indicative of either of the two axes, and one of the knobs of said second command panel is used to move the current position of the workpiece on the display in a first direction indicative of one of the two axes to a point of intersection with the straight line and then moving the current position along the straight line to a desired position, said driving means driving the machine tool corresponding to the desired position based upon the usage of said one of the knobs.

4. The numerical control device as claimed in claim 3, wherein said one of the knobs is used to move the current position of the workpiece on the display in a second direction perpendicular to the first direction and indicative of the other one of the two axes to a point of intersection with the straight line and then moving the current position along the straight line to a second desired position, said driving means driving the machine tool corresponding to the second desired position based upon the usage of said one of the knobs.

* * * * *